United States Patent
Priebe et al.

(10) Patent No.: US 12,023,726 B2
(45) Date of Patent: Jul. 2, 2024

(54) PRODUCT FOR REDUCING SAND ADHESIONS

(71) Applicant: ASK Chemicals GmbH, Hilden (DE)

(72) Inventors: Christian Priebe, Wulfrath (DE); Matthias Peter, Hattingen (DE)

(73) Assignee: ASK Chemicals GmbH, Hilden (DE)

( * ) Notice: Subject to any disclaimer, the term of this patent is extended or adjusted under 35 U.S.C. 154(b) by 0 days.

(21) Appl. No.: 18/012,355

(22) PCT Filed: Jul. 9, 2021

(86) PCT No.: PCT/DE2021/100601
§ 371 (c)(1),
(2) Date: Dec. 22, 2022

(87) PCT Pub. No.: WO2022/008007
PCT Pub. Date: Jan. 13, 2022

(65) Prior Publication Data
US 2024/0042514 A1    Feb. 8, 2024

(30) Foreign Application Priority Data
Jul. 20, 2020 (DE) ..................... 10 2020 118 314.3

(51) Int. Cl.
| | | |
|---|---|---|
| B22C 1/22 | (2006.01) |
| B22C 9/10 | (2006.01) |
| C08G 18/08 | (2006.01) |
| C08G 18/40 | (2006.01) |
| C08G 18/54 | (2006.01) |
| C08G 18/62 | (2006.01) |
| C08G 18/76 | (2006.01) |
| C08J 5/00 | (2006.01) |

(52) U.S. Cl.
CPC .......... *B22C 1/2213* (2013.01); *B22C 1/2253* (2013.01); *B22C 1/2273* (2013.01); *B22C 9/10* (2013.01); *C08G 18/0852* (2013.01); *C08G 18/4063* (2013.01); *C08G 18/542* (2013.01); *C08G 18/6208* (2013.01); *C08G 18/7671* (2013.01); *C08J 5/005* (2013.01); *C08J 2375/04* (2013.01)

(58) Field of Classification Search
CPC ....... B22C 1/14; B22C 1/2253; B22C 1/2273; C08G 18/0852; C08G 18/2865; C08G 18/542; C08G 18/69; C08G 18/694; C08G 18/7664
See application file for complete search history.

(56) References Cited

U.S. PATENT DOCUMENTS

| | | |
|---|---|---|
| 3,409,579 A | 11/1968 | Robins |
| 4,321,186 A | 3/1982 | Allison |
| 6,482,894 B1 | 11/2002 | Chang |
| 9,102,778 B2 | 8/2015 | Sprenger |
| 10,919,085 B2 | 2/2021 | Ernst |
| 2011/0251348 A1 | 10/2011 | Kloppenburg |

FOREIGN PATENT DOCUMENTS

| | | |
|---|---|---|
| CN | 103992633 | 7/2016 |
| JP | 2003181594 A | 7/2003 |
| WO | 2014059969 A2 | 4/2014 |

*Primary Examiner* — Kevin E Yoon
(74) *Attorney, Agent, or Firm* — Standley Law Group LLP; Jeffrey S. Standley; Kenny W. Pung

(57) ABSTRACT

Molding material mixes that contain a polyurethane binder based on phenolic resins of the benzyl ether type and polyisocyanates are characterized by the inclusion of a polybutadiene derivative. In one case, the polybutadiene derivative has epoxide groups and hydroxyl groups. In another case, the polybutadiene derivative has succinic acid anhydride groups. Molds, cores and risers are produced using these molding material mixes. Inclusion of the polybutadiene derivatives results in a reduction of sand adhesions in the molding process.

19 Claims, No Drawings

PRODUCT FOR REDUCING SAND ADHESIONS

INTRODUCTION

The present invention relates to molding material mixtures containing a polyurethane binder on the basis of phenolic resins of the benzyl ether type, polyisocyanates and furthermore a polybutadiene derivative having epoxide groups and hydroxyl groups or a polybutadiene derivative having succinic anhydride groups. The invention furthermore relates to an isocyanate component and the polyurethane binder on the basis of phenolic resins as well as cores, casting molds or feeders as well as the use of polybutadiene derivatives as release agents or agents for reducing sand adhesions, respectively.

Background of the Invention and Prior Art

The production of cores and molds according to the PUCB and/or according to the PUNB process has become very important in the foundry industry. Two-component polyurethane systems are used thereby to bind a refractory molding base material. The polyol component consists of one polyol with at least two OH groups per molecule, the isocyanate component consists of one polyisocyanate with at least two NCO groups per molecule. Among others, phenol formaldehyde resins are used as polyol component. In the case of the PUCB process, the curing of the mixture of at least molding base material and binder, also referred to as molding material mixture in short, takes place with the help of low-boiling tertiary amines, which are guided through the molding material mixture in gaseous form or as aerosol after the molding (see U.S. Pat. No. 3,409,579). This usually takes place with the help of a carrier gas, e.g., air, nitrogen, or $CO_2$, into which at least one tertiary amine is metered. In the case of the PUNB process, an addition of liquid tertiary amines and/or metal compounds occurs as catalyst to the molding material mixture.

Polybutadiene and derivatives of the polybutadiene have been proposed in U.S. Pat. No. 9,102,778, respectively, as modifying agents for phenolic resins. There, they essentially fulfill the function of a softener. Benzyl ether resins and the conversion of the phenolic resins with polyisocyanates to obtain a binder are not described.

U.S. Pat. No. 4,321,186 describes foundry binders containing high vinyl 1,3-butadiene derivatives with a vinyl content of greater than 40% and a molecular weight of M 5000 to 50000 g/mol. They are mixed with sand and are oxidatively cured by means of a desiccant and/or a peroxide at partially elevated temperature. Phenolic resin or isocyanate is not added.

Additives on the basis of factice are known from WO 2018/177480 A1 for reducing the adhesion tendency of molds and cores in the core box. In this publication, it is explained with regard to the background of the invention that it is known for waterglass-bonded molds to add organic additives to the molding material mixture to improve the casting surface. In an enumeration, polyolefins, such as, for example, polyethylene or polypropylene, copolymers of olefins, such as ethylene and/or propylene with further co-monomers, such as vinal acetate or styrene and/or diene monomers, such as butadiene, are also mentioned as suitable organic additives. The same information can also be found in WO 2014/059969 A2. However, the polybutadienes are not derivatized in terms of the present invention.

A release agent as constituent of urethane-bonded molding materials is introduced in JP 2003181594 A. The release agent is a modified polybutadiene with an alcohol group at both ends of the polybutadiene chains. It is specified in particular that these are phenolic hydroxyl groups in each case. An aromatic diisocyanate and a phenolic resin is proposed as binder constituents. The phenol-modified polybutadiene is produced in that a polybutadiene with an alcohol hydroxyl group at both ends of the molecule is initially converted with a diisocyanate compound by forming an isocyanate group at both ends or at one end of the molecule. A conversion is subsequently performed by means of a compound with two or more phenolic cores in the molecule. The phenol-modified polybutadiene preferably has a number-average molecular weight of 500 to 10,000 g/mol. The used diisocyanate is, e.g., diphenylmethane diisocyanate (MDI), polymeric MDI, or an aliphatic polyisocyanate, such as hexamethylene diisocyanate. Bisphenols, such as bisphenol F and bisphenol A, phenolic oligomers, such as trisphenol and tetraphenol, phenolic resins of the novolac type, resole type, and phenolic resins of the benzyl ether type are examples for the compound with two or more phenolic cores. They can be used alone or in combination.

OBJECT OF THE INVENTION

The object of the invention is the provision of a molding material mixture, which reduces the sand adhesion, in particular in the core box, during the core or mold production. The molding material mixture or the mold or core production, respectively, by using the molding material mixture is to require less cleaning effort and is to thus be more productive and is to optionally also lead to improved surfaces of the molds and cores produced in this way. The object is thus to find a good internal release agent.

SUMMARY OF THE INVENTION

The object was solved by means of the subject matter of the independent patent claims. Advantageous further developments are subject matter of the subclaims or are described below.

The molding material mixtures according to the invention comprise at least:
 a) one refractory molding base material,
 b) one binder comprising phenolic resins of the benzyl ether type and polyisocyanates or the conversion products thereof, respectively and
 c) one polybutadiene derivative having epoxide groups and hydroxyl groups or one polybutadiene derivative having succinic anhydride groups.

The object of the invention is thus the use of polybutadiene derivatives as part of a molding material mixture, which contains phenolic resins of the benzyl ether type and polyisocyanates as binders. Individually or jointly, the polybutadiene derivative having epoxide groups and hydroxyl groups or the polybutadiene derivative having succinic anhydride groups will also be referred to below in short only as "the polybutadiene derivative".

Claim object is furthermore a binder comprising at least two components, which are present separately from one another:
 i) a polyol component comprising
    at least one phenolic resin of the benzyl ether type and
 ii) an isocyanate component comprising:
    at least one polyisocyanate comprising at least two isocyanate groups per molecule;

at least one polybutadiene derivative having epoxide groups and hydroxyl groups or a polybutadiene derivative having succinic anhydride groups and a solvent for the polyisocyanate and the polybutadiene derivative.

Object of the invention is thus furthermore a binder containing, in addition to the binder component, the polybutadiene derivative as part of the isocyanate component.

Claim object is furthermore an isocyanate component comprising:

at least one polyisocyanate comprising at least two isocyanate groups per molecule;

at least one polybutadiene derivative having epoxide groups and hydroxyl groups or a polybutadiene derivative having succinic anhydride groups and a solvent for the polyisocyanate and the polybutadiene derivative.

In the polybutadiene derivative, the polybutadiene forms the main chain, wherein the butadiene monomer units can be cis-(1,4-incorporation), trans-(1,4-incorporation) and/or vinylically-(1,2-incorporation) linked.

The polybutadiene derivative has, e.g., an average molecular weight (number average) of 500 to 50000 g/mol, preferably of 750 to 40000 g/mol, more preferably of 1000 to 20000 g/mol, and most preferably of 1200 to 10000 g/mol.

The polybutadienes are derivatized by means of proportional conversion of the double bonds in the main chain:

epoxidation of proportional double bonds to obtain epoxide groups or attachment of maleic anhydride proportionally to double bonds of the polybutadiene to obtain succinic anhydride groups.

The addition of maleic anhydride can take place in the form of a Michael addition:

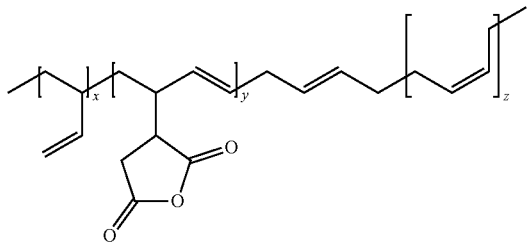

and/or in the form of a Diels-Alder reaction after isomerization of the double bonds, wherein only one butadiene unit of the polybutadiene main chain is illustrated below (also referred to as succinic anhydride group):

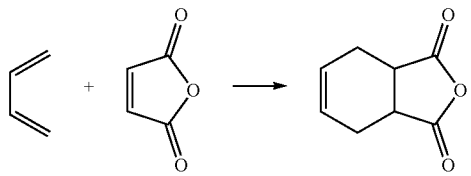

For example, 1 to 3 maleic anhydride molecules per polybutadiene molecule are added to the polybutadiene chain, in particular in the form of succinic anhydride groups and preferably by means of Michael addition, in addition to non-converted double bonds of the polybutadiene chain.

According to a further alternative of the invention, the polybutadiene derivative has epoxide groups and hydroxyl groups, in particular terminal hydroxyl groups. An example for such a structure is:

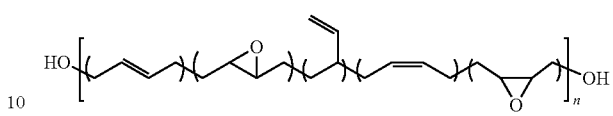

In the isocyanate component, the OH group can be converted with the polyisocyanate. It is generally assumed, however, that in the absence of a catalyst and without temperature treatment, the OH group does not convert with the polyisocyanate.

The epoxide groups, occasionally also referred to as epoxy group(s), are preferably added to the double bond of the cis- and/or trans-1,4 incorporated butadiene groups. Such products are commercially available from CRAY VALLEY. The polybutadiene derivative can also be referred to as epoxidized polybutadiene.

The polybutadiene derivative has, e.g., 1.5 to 10, preferably 2 to 8, epoxide groups per molecule. The double bonds of the polybutadiene are thus only converted proportionally. The polybutadiene forms the main chain.

In addition, the following can be performed:

attachment of polyisocyanates (e.g. TDI) to the hydroxyl groups, so that one or at least one NCO functionality of the polyisocyanates is maintained.

The polybutadiene derivative is preferably dissolved in a solvent, in particular in a solvent of the isocyanate component.

It is furthermore possible to separately add the polybutadiene derivative to the molding material mixture in the form of a solution or emulsion/dispersion or pure polybutadiene derivative, respectively, as third component. If it is used as solution, the same solvents can be used, which are also used for the isocyanate component. When being used as emulsion/dispersion, an emulsifier can be added.

The quantity of the used polybutadiene derivative can be defined as follows:

The quantity of the polybutadiene derivative in the isocyanate component (as far as in the isocyanate component) preferably lies between 0.3 and 6.0% by weight, more preferably between 0.5 and 4.0% by weight, and most preferably between and 3.5% by weight. The simultaneous or sole addition of the polybutadiene derivative to the polyol component is less preferred.

The used quantity of the polybutadiene derivative with regard to the used binder (including possible solvents) is preferably between 0.15 and 3.0% by weight, more preferably between 0.25 and 2.0% by weight, and most preferably between 0.3 and 1.75% by weight.

According to all embodiments, the quantity of the polybutadiene derivative based on the molding material mixture is then preferably between 0.0005-0.1% by weight, more preferably between 0.001 and 0.08% by weight, and most preferably between 0.001 and 0.06% by weight.

The refractory molding base materials are materials, which have a high melting point (melting temperature), and which are present in particulate form. The melting point of the refractory molding base material is greater than 600° C. The refractory molding base material preferably accounts for more than 80% by weight of the molding material mixture. The average diameter of the refractory molding base materials generally lies between 100 and 600 μm.

DETAILED DESCRIPTION OF THE INVENTION

All conventionally used phenolic compounds are suitable to produce the phenolic resins of the benzyl ether type. In addition to unsubstituted phenols, substituted phenols or mixtures thereof can be used. The phenolic compounds are preferably not substituted either in both ortho positions or in one ortho and in the para position. The remaining ring carbon atoms can be substituted. Examples for substituted phenols are alkyl-substituted, alkoxy-substituted, aryl-substituted, and aryloxy-substituted phenols.

In addition to —$CH_2$— linked phenolic units, the basic structure of a phenolic resin of the benzyl ether type necessarily has —$CH_2$—O—$CH_2$— linked phenolic units and can be illustrated in an exemplary manner (with regard to a product, which is only converted with formaldehyde) as follows

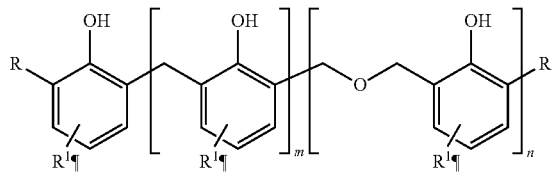

The different units are typically statistically distributed. $R^1$ is thereby in each case independently (in particular of m and n) hydrogen or a hydrocarbyl, in particular an alkyl-, or a —O-hydrocarbyl-substituent with C1 to C26, preferably C1 to C15 (saturated or unsaturated, a straight chain or branched) in ortho, meta, or para position to the phenolic hydroxyl group; the sum of m and n is at least 2 and the ratio m/n is preferably at least 1; R is independently hydrogen, —$CH_2OH$ or —$CH_2O$—$R^2$ with $R^2$=a C1 to C9 hydrocarbon. The radical R can be a straight chain or branched, saturated or unsaturated. Up to 25 mol % of the —$CH_2OH$ groups in the phenolic resins of the benzyl ether type can be etherified.

Examples for suitable phenolic compounds are phenol, o-cresol, m-cresol, p-cresol, 3,5-xylenol, 3,4-xylenol, 3,4,5-trimethylphenol, 3-ethylphenol, 3,5-diethylphenol, p-butylphenol, 3,5-dibutylphenol, p-amylphenol, cyclohexylphenol, p-octylphenol, p-nonylphenol, dinonylphenol, 3,5-dicyclohexylphenol, p-crotylphenol, p-phenylphenol, 3,5-dimethoxyphenol, cardanol, cardol, and p-phenoxyphenol. In particular, one or several substituted phenols are used as co-monomer in addition to phenol.

Preferred polyvalent phenolic compounds have 2 to 4 phenolic hydroxyl groups. Specific examples of suitable polyvalent phenols are pyrocatechol, resorcin, hydroquinone, pyrogallol, phloroglucinol, 2,5-dimethylresorcin, 4,5-dimethylresorcin, 5-methylresorcin, or 5-ethylresorcin. Mixtures of different monovalent and polyvalent and/or substituted and/or condensed phenols can also be used for the production of the benzyl ether resin.

Phenol itself is particularly preferred. More highly condensed phenols, such as bisphenol A, are also suitable. Polyvalent phenols, which have more than one phenolic hydroxyl group, are furthermore also suitable.

Formaldehyde is generally used as aldehyde, either in its aqueous form, as paraformaldehyde or trioxane. In addition to formaldehyde, aldehydes of the following formula are additionally also suitable as further aldehydes for the production of the phenolic resin:

R—CHO, wherein R is a carbon radical with preferably 2 to 8, particularly preferably 2 or 3 carbon atoms. Specific examples are acetaldehyde, propionaldehyde, furfuraldehyde, and benzaldehyde.

Salts of bivalent ions of metals, such as Mn, Zn, Cd, Mg, Co, Ni, Fe, Pb, Ca, and Ba, in particular Zn salts, are catalysts, which are suitable to produce phenolic resins of the benzyl ether type. Zinc acetate is preferably used. Typical quantities of metallic catalysts are 0.02 to 0.3% by weight, preferably 0.02 to 0.18% by weight, based on the total quantity of phenolic compound and aldehyde compound.

An at least equivalent molar number of aldehyde compound, based on the molar number of the phenolic compound, is used to obtain phenolic resins of the benzyl ether type. The molar ratio of aldehyde to phenol is preferably 1.05:1.0 to 2.5:1, more preferably 1.1:1 to 2.2:1, most preferably 1.2:1 to 2.0:1.

The production of the phenolic resin of the benzyl ether type takes place according to the process, which is known to the person of skill in the art. The phenolic compound and the aldehyde compound are thereby converted in the presence of a bivalent metal ion, at temperatures of preferably less than 130° C. The resulting water is distilled off. For this purpose, a suitable entrainer can be added to the reaction mixture, for example toluol or xylol, or the distillation is performed at reduced pressure.

Phenolic resins of the benzyl ether type are described, e.g., in U.S. Pat. No. 3,485,797 and in EP 1137500 B1, to the disclosure of which reference is made expressly hereby with regard to the phenolic resins of the benzyl ether type itself, as well as with regard to the production thereof, and the disclosure of which is also made object of the present application in this respect.

The phenolic resin of the benzyl ether type preferably has an average molecular weight (MW) of 600 to 1200 g/mol, in particular of 600 to 1000 g/mol, measured in particular according to DIN 55672-1.

The isocyanate component of the binder system comprises an aliphatic, cycloaliphatic, or aromatic monomeric or polymeric isocyanate, preferably with an average of 2 to 5 isocyanate groups per molecule. Depending on the desired properties, mixtures of isocyanates can also be used.

Suitable isocyanates comprise aliphatic isocyanates, such as, e.g., hexamethylene diisocyanate, alicyclical isocyanates, such as, e.g., 4,4'-dicyclohexylmethane diisocyanate and dimethyl derivatives thereof. Examples of suitable aromatic isocyanates are toluol-2,4-diisocyanate, toluol-2,6-diisocyanate, 1,5-naphthalene diisocyanate, triphenylmethane triisocyanate, xylylene diisocyanate, and methyl derivatives thereof, as well as polymethylene polyphenyl isocyanates. Preferred isocyanates are aromatic isocyanates, particularly preferred are polymethylene polyphenyl polyisocyanates, such as, e.g., technical 4,4'-diphenyl methane diisocyanate, i.e. 4,4'-diphenyl methane diisocyanate with a portion of isomers and higher homologs.

The isocyanates can also be derivatized in that bivalent isocyanates are converted with one another in such a way that a part of their isocyanate groups is derivatized into biuret, allophanate, uretidone or carbodiimide groups. Of interest are, e.g., dimerization products having uretidone groups, e.g. of MDI or TDI. Derivatized isocyanates of this type, however, are preferably only used as one constituent in addition to the above non-derivatized isocyanates.

The isocyanate is preferably used in such a quantity that the number of the isocyanate groups is from 80 to 120%, based on the number of the free hydroxyl groups in the polyol component or in the phenolic resin of the benzyl ether type.

According to an embodiment, greater than 50% by weight, in particular greater than 80% by weight, as well as also all polyols in the polyol component are a phenolic resin of the benzyl ether type.

The isocyanate component has an organic solvent for the isocyanate component. Solvents can be required, e.g., to hold the components of the binder in a sufficiently low-viscous state. The polybutadiene derivative is to be dissolved homogenously and is to be dissolved in a stable (e.g. frost-proof) manner.

Alkylaromatics are preferred, whereby the alkyl group(s) are one or several 01 to C20 hydrocarbon radicals. Based on, e.g., benzol, the aromatic ring is thereby substituted, e.g., with one or several alkyl and/or alkylene groups, which in each case have a chain length from C1 to C20, preferably from C3 to C16. The alkyl or alkenyl radical can be a straight chain or can be branched. Examples are solvent naphtha, such as, e.g., solvesso 100 or solvesso 150 ND.

Alkane-/alkene-containing solvents, such as paraffinic solvents, white spirits and petroleum distillate fractions are likewise suitable as solvents, in particular as co-solvents, in addition to the above alkylaromatics.

Fatty acid esters, which can be obtained from the conversion of saturated or unsaturated, linear, or branched C6- to C32 fatty acids with straight-chained or branched monoalcohols from 01 to C8 are furthermore preferred as solvents for the isocyanate component. Examples for this are fatty acid methyl ester, isopropyl laurate, ethylhexyl laurate, isopropyl myristate, and oleic acid butyl ester.

Silicic acid esters, in particular esters of the ortho silicic acid, are also suitable as solvents for the isocyanate component, wherein the respective alcohol radical has 1 to 6 carbon atoms. Monomeric or polymeric tetraethyl silicate is an example for a silicic acid ester.

The above-mentioned solvents can also be used as mixtures with one another in the isocyanate component.

The solvent for the isocyanate component is preferably used in a quantity of 5 to 40% by weight, more preferably of 10 to 35% by weight, and most preferably of 12 to 30% by weight, based on the isocyanate component.

Preferably, 95 to 60% by weight of the isocyanate component, more preferably 90 to 65% by weight, and most preferably 88 to 70% by weight, are the polyisocyanate.

For example, the above-described alkyl benzoles, fatty acid esters or silicic acid esters are suitable as organic solvents for the polyol component.

Oxygen-rich polar, organic solvents can furthermore be used. In particular dicarboxylic acid esters, glycol ether esters, glycol diesters, cyclical ketones, cyclical esters (lactones), cyclical carbonate, or silicic acid esters or the mixtures thereof are suitable. Dicarboxylic acid esters, cyclical ketones, and cyclical carbonates are preferably used.

Typical dicarboxylic acid esters have the formula $R_1O(O)C—R_2—C(O)OR_1)$, wherein $R_1$ represents an alkyl group with 1 to 12, preferably 1 to 6, carbon atoms, in each case independently of one another (in particular of the second $R_1$, and $R_2$ is a hydrocarbon group, straight-chained or branched, with 1 to 7 carbon atoms. Examples are dimethyl esters of carboxylic acids with 4 to 6 carbon atoms, which are available from DuPont, e.g., under the name Dibasic Ester.

Typical glycol esters are compounds of the formula $R_3—O—R_4—O(O)CR_5$, wherein $R_3$ represents an alkyl group with 1 to 4 carbon atoms, $R_4$ is a hydrocarbon group with 2 to 4 carbon atoms, and $R_5$ is an alkyl group with 1 to 3 carbon atoms, e.g. butyl glycol acetate, glycol ether acetates are preferred.

Typical glycol diesters therefore have the general formula $R_3C(O)O—R_4—O(O)CR_5$, wherein $R_3$ to $R_5$ are as defined above, and the radicals are in each case selected independently of one another (e.g. propylene glycol diacetate). Glycol diacetates are preferred. Glycol diethers can be characterized by the formula $R_3—O—R_4—O—R_5$, in which $R_3$ to $R_5$ are as defined above, and the radicals are in each case selected independently of one another (e.g. dipropylene glycol dimethyl ether).

Typical cyclical ketones, cyclical esters, and cyclical carbonates with 4 to 5 carbon atoms are likewise suitable (e.g. propylene carbonate). The carbons can be linked in a branched or unbranched manner and can be present in saturated or unsaturated form.

The solvent is preferably used in a quantity of 10 to 70% by weight, more preferably of 26 to 55% by weight, and most preferably of 41 to 50% by weight, based on the polyol component.

In addition to the already mentioned constituents, the binder systems can contain further additives, e.g., silanes (e.g. according to EP 1137500 B1), dry oils (e.g. according to U.S. Pat. No. 4,268,425), complexing agents (e.g. according to U.S. Pat. No. 5,447,968), flow improvers, such as silicon surfactants, and additives for extending the processing time (e.g. according to U.S. Pat. No. 4,540,724), or mixtures thereof.

The invention furthermore relates cores, molds, and feeders produced after curing from the molding material mixtures. The use of the cores, molds, and feeders for the metal casting, in particular the iron as well as aluminum casting, is also object of the invention.

Common and known materials as well as the mixtures thereof can be used as refractory molding base material (hereinafter also molding base material in short) for the production of casting molds. Suitable are, for example, quartz sand, zirconium sand, chrome ore sand, olivine, vermiculite, bauxite, chamotte as well as so-called artificial molding base materials, thus molding base materials, which were brought into spherical or approximately spherical (for example ellipsoidal) form by means of industrial molding processes. Examples for this are glass beads, glass granulate, or artificial, spherical, ceramic sands—so-called CERA-BEADS® but also SPHERICHROMEO, SPHEROX®, or CARBOACCUCAST®", as well as hollow microspheres, as they can be isolated, for example, as component from fly ashes, among others, such as, e.g., aluminum silicate hollow spheres (so-called microspheres). Mixtures of the mentioned refractory materials are likewise possible.

The refractory molding base material comprises in particular more than 20% by weight of quartz sand, based on the used refractory molding base material, more preferably more than 40% by weight, most preferably more than 60% by weight of quartz sand.

A refractory molding base material is understood to be materials, which have a high melting point (melting temperature). The melting point of the refractory molding base material is preferably greater than 600° C., preferably greater than 900° C., more preferably greater than 1200° C., and most preferably greater than 1500° C.

The refractory molding base material preferably accounts for more than 80% by weight, in particular more than 90% by weight, more preferably more than 95% by weight, of the molding material mixture.

The average diameter of the refractory molding base materials generally lies between 100 µm and 600 µm, preferably between 120 µm and 550 µm, and more preferably between 150 µm and 500 µm. The particle size can be determined, e.g., by means of sieving according to DIN ISO 3310. Particularly preferred are particle shapes with largest length expansion to smallest length expansion (at a right angle to one another and in each case for all spatial directions) from 1:1 to 1:5 or 1:1 to 1:3, i.e. those that are not fibrous, for example.

The refractory molding base material preferably has a free-flowing state, in particular in order to be able to process the molding material mixture according to the invention in conventional core shooting machines.

Suitable catalysts are tertiary amines, which can be used individually or in combination. It is furthermore possible to use different tertiary amine sequentially, for example according to EP 2374320. Volatile tertiary amines are used for the PUCB process, such as trimethyl amine ("TMA", CAS RN 75-50-3), dimethyl ethyl amine ("DMEA", CAS 75-64-9), dimethyl isopropyl amine ("DMIPA", CAS 996-35-0), dimethyl propyl amine ("DMPA", CAS RN 926-63-6), and triethyl amine ("TEA", CAS RN 121-44-8).

Liquid tertiary amines are used for the PUNB process. At room temperature (25° C.), this includes liquid tertiary amines as well as those that become liquid after heating to, e.g., 40° C., or those that are dissolved in a suitable solvent. Examples are tris(3-dimethylamino)propyl amine, isoquinoline, arylpyridines, such as phenyl pyridine, pyridine, acridine, 2-methoxypyridine, pyridazine, 3-chloropyridine, quinoline, N-methylimidazole, N-ethylimidazole, 4,4'-dipyridine, 4-phenylpropylpyridine, 1-methylbenzimidazole, N-vinylimidazole, and 1,4-thiazine.

In addition, the invention relates to a process for producing a casting mold or a core comprising
(a) mixing refractory molding base materials with the binder according to the invention (at least phenolic resin of the benzyl ether type and isocyanate) in a binding quantity from 0.2 to 15% by weight, preferably 0.3 to 14% by weight, more preferably 0.4 to 12% by weight, based on the quantity of the refractory molding base materials, and a catalyst, which is separately added later, for obtaining a casting mold or a core,
(b) introducing the molding material mixture obtained in step (a) into a molding tool;
(c) adding the catalyst, which is separately added later, and curing the molding material mixture in the molding tool by means of the catalyst according to the invention, in order to obtain a core or a casting mold; and
(d) subsequent separating of the core or of the casting mold from the tool and optional further curing.

If the polybutadiene derivative is not added with the isocyanate component (which then contains a solvent) or not with the binder, respectively, it can be added in solution or emulsion/dispersion before or after the binder, the polybutadiene derivative is otherwise part of the binder or of the isocyanate component, respectively.

For the production of the molding material mixture, the components of the binder system can first be united and can then be added to the refractory molding base material. It is also possible, however, to add the components of the binder simultaneously or one after the other in any order to the refractory molding base material.

Common processes can be used to attain an even mixing of the components of the molding base material. In addition, the molding base mixture can optionally contain other conventional constituents, such as iron oxide, ground flax fibers, saw dust pellets, pitch, and refractory metals.

The curing according to the PUCB or according to the PUNB process take place, preferably according to the PUCB process. In the case of the PUCB process, a low-boiling tertiary amine is guided through the molded molding material mixture in a gaseous form or as aerosol by means of an inert carrier gas for curing purposes. All known cold box amine catalysts can be used. In the case of the PUNB process, the amine or metallic catalyst can already be dissolved in the binder system or can be added to the refractory material as separate component, wherein the quantity added is approx. 0.1% by weight to approx. 5% by weight, based on the total content of binder in the refractory material.

The molds produced according to this process can, per se, have any shape, which is common in the foundry field. In a preferred embodiment, the molds are present in the shape of foundry molds, cores, or feeders. They are characterized by a high mechanical stability.

The invention further relates to the use of this mold for the metal casting, in particular iron as well as aluminum casting.

The invention will be described in more detail hereinafter on the basis of preferred embodiments or experiment examples, respectively, without being limited to them.

Experimental Part

All specifications in % by weight.

| Used materials: | |
|---|---|
| KATALYST 706 | dimethyl propylamine, supplier: ASK Chemicals GmbH |
| Quartz sand H 32 | supplier Quarzwerke GmbH |
| Lupranat M 20 S | polymeric MDI, functionality 2,6, supplier: BASF SE |
| Linear alkyl benzol | C10-13 alkyl benzol, supplier: ISU |
| Petroleum | mixture of aromatics, alkanes, and cycloalkanes, supplier: Brenntag |
| Propylene carbonate | supplier: Aldrich |
| Butyl tallate | tall oil fatty acid butyl ester, Valliflex B, supplier: Umicore |
| Tetraethoxysilicate | tetraethylsilicate, supplier: Aldrich |
| Solvesso 100 | solvent naphtha light, Sdp 140-180° C., supplier: Exxon |
| Poly bd 605-E | polybutadiene derivative, hydroxy-terminated, containing epoxide groups, supplier: CRAY VALLEY, molecular weight 1450 g/mol. |
| Cresol LBH-P 2000 | hydroxy-terminated polybutadiene derivative, supplier: Cray Valley |
| Polyvest HT | hydroxy-terminated polybutadiene, supplier: Evonik |
| Polyvest EPMA 120 | polybutadiene, containing succinic acid groups, supplier: Evonik |
| ASKOCURE 388: | phenolic resin of the benzyl ether type in aromatic solvents and fatty acid esters, supplier: ASK Chemicals GmbH |
| ECOCURE 10 DR 4531/1 | phenolic resin of the benzyl ether type o-cresol-modified in aromatic solvents and fatty acid esters, supplier: ASK Chemicals GmbH |
| ECOCURE BLUE 30 HE 1 | phenolic resin of the benzyl ether type, <1% free phenol in esters as solvent, supplier: ASK Chemicals GmbH |

Production of the Test Solutions

The polybutadiene derivatives were weighed into a suitable container at room temperature, were mixed with the solvent or solvents, respectively, mentioned in examples A1-A15 to B1-B14, and were dissolved completely by means of shaking. Lupranat M 20 S was added subsequently, and the mixture was homogenously mixed again by means of shaking.

Assessment of the Solubility 30 minutes after the production, the air bubble-free mixtures were assessed visually.

All samples were stored for 24 h at −18° C. After temperature adaptation to room temperature occurred, the appearance was assessed again.

TABLE 1

| Isocyanate component | according to the invention | | not according to the invention | |
|---|---|---|---|---|
| | B5 | B6 | A4 | A5 |
| Lupranat M 20 S | 75 | 75 | 75 | 75 |
| Linear alkyl benzol | 9.15 | 9.15 | 9.15 | 9.15 |
| Solvesso 100 | 8.85 | 8.85 | 8.85 | 8.85 |
| Petroleum | 5 | 5 | 5 | 5 |
| Poly bd 605-E | 2 | | | |
| Polyvest EPMA 120 | | 2 | | |
| Cresol LBH-P 2000 | | | 2 | |
| Polyvest HT | | | | 2 |
| 30 min after production | clear | clear | turbid | turbid |
| 24 h-18° C. thawed | clear | clear | 2 phases | 2 phases |
| | B2 | B7 | A6 | A7 |
| Lupranat M 20 S | 83 | 83 | 83 | 83 |
| Linear alkyl benzol | 15 | 15 | 15 | 15 |
| Poly bd 605-E | 2 | | | |
| Polyvest EPMA 120 | | 2 | | |
| Cresol LBH-P 2000 | | | 2 | |
| Polyvest HT | | | | 2 |
| 30 min after production | clear | clear | 2 phases | 2 phases |
| 24 h-18° C. thawed | clear | clear | 2 phases | 2 phases |
| | B4 | B8 | A8 | A9 |
| Lupranat M 20 S | 77 | 77 | 77 | 77 |
| Solvesso 100 | 21 | 21 | 21 | 21 |
| Poly bd 605-E | 2 | | | |
| Polyvest EPMA 120 | | 2 | | |
| Cresol LBH-P 2000 | | | 2 | |
| Polyvest HT | | | | 2 |
| 30 min after production | clear | clear | clear | clear |
| 24 h-18° C. thawed | clear | clear | 2 phases | 2 phases |
| | B9 | B10 | A10 | A11 |
| Lupranat M 20 S | 80 | 80 | 80 | 80 |
| Propylene carbonate | 18 | 18 | 18 | 18 |
| Poly bd 605-E | 2 | | | |
| Polyvest EPMA 120 | | 2 | | |
| Cresol LBH-P 2000 | | | 2 | |
| Polyvest HT | | | | 2 |
| 30 min after production | clear | clear | 2 phases | 2 phases |
| 24 h-18° C. thawed | clear | clear | 2 phases | 2 phases |
| | B11 | B12 | A12 | A13 |
| Lupranat M 20 S | 80 | 80 | 80 | 80 |
| Butyltallat | 18 | 18 | 18 | 18 |
| Poly bd 605-E | 2 | | | |
| Polyvest EPMA 120 | | 2 | | |
| Cresol LBH-P 2000 | | | 2 | |
| Polyvest HT | | | | 2 |
| 30 min after production | clear | clear | clear | clear |
| 24 h-18° C. thawed | clear | 2 phases | 2 phases | 2 phases |
| | B13 | B14 | A14 | A15 |
| Lupranat M 20 S | 80 | 80 | 80 | 80 |
| Tetraethyl orthosilicate | 18 | 18 | 18 | 18 |
| Poly bd 605-E | 2 | | | |

TABLE 1-continued

| Isocyanate component | according to the invention | | not according to the invention | |
|---|---|---|---|---|
| Polyvest EPMA 120 | | 2 | | |
| Cresol LBH-P 2000 | | | 2 | |
| Polyvest HT | | | | 2 |
| 30 min after production | clear | clear | turbid | turbid |
| 24 h-18° C. thawed | 2 phases | 2 phases | 2 phases | 2 phases |

Result Solubility:

The tables show that the polybutadiene derivatives with epoxide groups and hydroxyl groups or polybutadiene derivatives with succinic anhydride groups, compared to pure hydroxyl group-containing polybutadienes, show a significantly improved solubility and cold stability in combination with isocyanates and non-polar solvents.

Determination of the Adhesion Tendency

A molding material mixture of quartz sand H 32 and the corresponding binder components was produced in a Hobart mixer. For this purpose, both components were each homogenously stirred in for 1 minute. The composition of the molding material mixtures can be found in the tables.

The molding material mixture was transferred into the core shooting machine, and a core with a dimension (l×b×h) of 11 cm×5 cm×1.2 cm with a shooting pressure of 4 bar was produced in a shooting mold by means of compressed air. The shooting mold consisted of steel and was degreased by means of acetone before the first use and was not treated with an external mold release agent.

The core, which was shot into the mold, was cured by means of KATALYST 706 (1 ml, gassing time 10 sec at 2 bar cleaning pressure). After the curing, the core was removed from the mold. This process was repeated a total of 10 times with one and the same sand mixture, without the metallic mold being cleaned in-between or being treated with an external release agent. After the 10 shooting processes, the shooting mold was removed, and the formed sand adhesions (directly below the two shooting nozzles) were mechanically removed and weighed out. The quantity of the sand adhesions in grams of sand adhesion is a measure for the adhesion tendency of the tested sand mixture.

The strengths of the cores was furthermore determined in the test.

TABLE 2 tests for the sand adhesion - isocyanate component:

| | not according to the invention | | |
|---|---|---|---|
| Isocyanate component | A1 | A2 | A3 |
| Lupranat M 20 S | 83 | 77 | 75 |
| linear alkyl benzol | 17 | | 11.15 |
| Solvesso 100 | | 23 | 8.85 |

| | according to the invention | | | | | |
|---|---|---|---|---|---|---|
| Isocyanate component | B1 | B2 | B3 | B4 | B5 | B6 |
| Lupranat M 20 S | 83 | 83 | 83 | 77 | 75 | 75 |
| Linear alkyl benzol | 16 | 15 | 14 | | 9.15 | 9.15 |
| Solvesso 100 | | | | 21 | 8.85 | 8.85 |
| Petroleum | | | | | 5 | 5 |
| Poly bd 605-E | 1 | 2 | 3 | 2 | 2 | |
| Polyvest EPMA 120 | | | | | | 2 |

TABLE 3 tests for the sand adhesion—
molding material mixture:

| | not according to the invention | according to the invention | | |
|---|---|---|---|---|
| Radical sand H32 0.8% ECOCURE BLUE 30 HE 1 0.8% isocyanate component | A1 | B1 | B2 | B3 |
| Strength kPa after 5 sec | 3320 | 3298 | 3274 | 3206 |
| Sand residue (g) | 0.185 | 0.174 | 0.128 | 0.085 |
| Reduction in % Sand residue | | 6% | 31% | 54% |
| Radical sand H 32 0.6% ECOCURE BLUE 30 HE 1 0.6% isocyanate component | A1 | | B2 | |
| Strength kPa after 5 sec | 3233 | | 3168 | |
| Sand residue (g) | 0.064 | | 0.015 | |
| Reduction in % Sand residue | | | 76% | |
| Radical sand H 32 0.8% ASKOCURE 388 0.8% isocyanate component | A2 | | B4 | |
| Strength kPa after 5 sec | 5175 | | 4923 | |
| Sand residue (g) | 0.1 | | 0.06 | |
| Reduction in % Sand residue | | | 40% | |
| Radical sand H 32 0.6% ECOCURE 10 DR 4531/1 0.6% isocyanate component | A3 | B5 | B6 | |
| Strength kPa after 5 sec | 2961 | 3492 | 3241 | |
| Sand residue (g) | 0.806 | 0.457 | 0.314 | |
| Reduction in % Sand residue | | 43% | 61% | |

Release Effect:

It follows from the examples that the polybutadiene derivatives with epoxide groups or succinic anhydride groups effect a reduction of the sand adhesion in the core box. The effect is a function of the concentration (B1-63). It is advantageous that the polybutadiene derivatives do not significantly reduce the strength after 5 sec, thus immediately after ending the gassing process.

The invention claimed is:

1. A molding material mixture, comprising:
   a) a refractory molding base material,
   b) a binder comprising a phenolic resin of the benzyl ether type and a polyisocyanate or the conversion product thereof, respectively, and
   c) at least one of: a polybutadiene derivative comprising epoxide groups and hydroxyl groups, or a polybutadiene derivative comprising succinic anhydride groups.

2. The molding material mixture according to claim 1, wherein the polybutadiene derivative comprises succinic anhydride groups, and the polybutadiene derivative is obtained in particular by addition of maleic anhydride to the polybutadiene by means of a Michael addition or a Diels-Alder reaction.

3. The molding material mixture according to claim 1, wherein the polybutadiene derivative has succinic anhydride groups, and from 1 to 3 maleic anhydride molecules, in the form of succinic anhydride groups, added to the polybutadiene chain per polybutadiene molecule.

4. The molding material mixture according to claim 1, wherein:
   the hydroxyl groups of the polybutadiene derivative with epoxide groups have terminal hydroxyl groups, or
   the hydroxyl groups of the polybutadiene derivative with epoxide groups are terminal, or
   the hydroxyl groups are reacted with a polyisocyanate.

5. The molding material mixture according to claim 1, wherein the polybutadiene derivative has epoxide groups and hydroxyl groups, and the polybutadiene derivative has 1.5 to 10 epoxide groups per molecule.

6. The molding material mixture according to claim 1, wherein the polybutadiene derivative is contained in the molding material mixture in a quantity of 0.0005 to 0.1% by weight, in each case based on the molding material mixture.

7. The molding material mixture according to claim 1, wherein the polybutadiene derivative is contained in the molding material mixture in a quantity of from 0.15 to 3.0% by weight, based on the binder, including possible solvents of the binder.

8. The molding material mixture according to claim 1, wherein the polybutadiene derivative has a number-average molecular weight of 500 to 50000 g/mol.

9. The molding material mixture according to claim 1, wherein the polybutadiene derivative is used in dissolved form, and in particular the polyisocyanate forms part of an isocyanate component and the polybutadiene derivative is used dissolved in a solvent of the isocyanate component.

10. The molding material mixture according to claim 1, wherein the molding material mixture further comprises a solvent for the polybutadiene derivative, in particular as solvent for the polyisocyanates or the conversion product thereof, and the solvent is selected from the group consisting of: alkylaromatics, fatty acid esters, silicic acid esters, and the mixtures thereof.

11. The molding material mixture according to claim 1, wherein the phenolic resin of the benzyl ether type has an average molecular weight (MW) of 600 to 1200 g/mol, in particular of 600 to 1000 g/mol.

12. The molding material mixture according to claim 1, wherein the refractory molding base material is selected from the group consisting of: quartz sand, zirconium sand, chrome ore sand, olivine, vermiculite, bauxite, chamotte, glass beads, glass granulate, aluminum silicate hollow spheres, and the mixtures thereof, wherein, also independently thereof, based on the refractory molding base material, more than 20% by weight of the latter consists of quartz sand.

13. The molding material mixture according to claim 1, wherein greater than 70% by weight of the molding material mixture is the refractory molding base material.

14. The molding material mixture according to claim 1, wherein the refractory molding base material has an average particle diameter of 100 μm to 600 μm, determined by sieve analysis.

15. A binder comprising the following components, which are present separately from one another:
   i) a polyol component comprising
      a phenolic resin of the benzyl ether type, and ii) an isocyanate component comprising
- a polyisocyanate comprising at least two isocyanate groups per molecule,
- a solvent for the isocyanate component, and
- a polybutadiene derivative having epoxide groups and hydroxyl groups or a polybutadiene derivative having succinic anhydride groups.

16. The binder according to claim 15, wherein the polyol component, the polybutadiene derivative, and the solvent for the isocyanate component, also independently of one another, are further characterized by claim 1, and/or wherein the polybutadiene derivative is contained in the isocyanate component in a quantity of 0.3 to 6.0% by weight, based on the isocyanate component.

17. The isocyanate component according to claim 15, wherein the polybutadiene derivative is contained in the isocyanate component in a quantity of 0.3 to 6.0% by weight, based on the isocyanate component.

18. A process for producing molds, cores, or feeders, the process comprising:
forming the molding material mixture of claim 1 by bringing together at least the phenolic resin, the polyisocyanate, the polybutadiene derivative, and the refractory molding base material; and
curing by adding a tertiary amine.

19. An improved molding material mixture, exhibiting reduced adhesion, the molding material mixture comprising polyisocyanate, phenolic resin of the benzyl ether type and refractory molding base material, wherein the improvement comprises:
incorporating as a release agent in the molding material mixture, at least one of:
a polybutadiene derivative having epoxide groups and hydroxyl groups; and
a polybutadiene derivative having succinic anhydride groups, in particular as an internal release agent.

* * * * *

UNITED STATES PATENT AND TRADEMARK OFFICE
CERTIFICATE OF CORRECTION

| | | |
|---|---|---|
| PATENT NO. | : 12,023,726 B2 | Page 1 of 1 |
| APPLICATION NO. | : 18/012355 | |
| DATED | : July 2, 2024 | |
| INVENTOR(S) | : Priebe et al. | |

It is certified that error appears in the above-identified patent and that said Letters Patent is hereby corrected as shown below:

On the Title Page

Item (30) Foreign Application Priority Data line, please delete "July 20, 2020" and insert -- July 10, 2020 --.

Signed and Sealed this
Twenty-fifth Day of November, 2025

John A. Squires
*Director of the United States Patent and Trademark Office*